United States Patent [19]
Rao

[11] Patent Number: 5,267,326
[45] Date of Patent: Nov. 30, 1993

[54] BITMAP IMAGE SEGMENTATION USING A CHARGE MODEL FOR PIXELS

[75] Inventor: Arun Rao, Pittsford, N.Y.

[73] Assignee: Eastman Kodak Company, Rochester, N.Y.

[21] Appl. No.: 861,205

[22] Filed: Mar. 31, 1992

[51] Int. Cl.[5] .............................................. G06K 9/00
[52] U.S. Cl. ........................................ 382/9; 382/48; 382/61
[58] Field of Search ....................... 382/9, 48, 61, 1, 22

[56] References Cited

U.S. PATENT DOCUMENTS

| | | | |
|---|---|---|---|
| 4,379,282 | 4/1983 | Bailey | 382/9 |
| 4,731,858 | 5/1988 | Grasmueller et al. | 382/9 |
| 4,745,550 | 5/1988 | Witkin et al. | 364/422 |
| 4,764,970 | 8/1988 | Hayashi et al. | 382/1 |
| 4,893,188 | 1/1990 | Murakami et al. | 358/456 |
| 4,903,313 | 2/1990 | Tachikawa | 382/27 |
| 4,906,940 | 3/1990 | Greene et al. | 382/16 |
| 4,910,786 | 3/1990 | Eichel | 382/22 |

OTHER PUBLICATIONS

A. Rosenfeld & A. Kak, *Digital Picture Processing*, vol. 2, 2nd ed., Academic Press, pp. 55-108.

D. G. Elliman et al., A Review of Segmentation and Contextural Analysis Techniques for Text Recognition, *Pattern Recognition*, vol. 23, No. 3/4, 1990, pp. 337-346.

*Primary Examiner*—Joseph Mancuso
*Attorney, Agent, or Firm*—Dennis R. Arndt

[57] ABSTRACT

A method and apparatus for segmenting a bitmapped image (200). In general, the bitmap image is modeled as a parallel plate capacitor. In so doing, opposing boundaries (302, 304) of the bitmap image are each assigned a voltage value and each pixel (300, 301) within the bitmap image is assigned a charge value. Generally, a positive charge is assigned to the pixels which comprise a pattern in the bitmap image and the remainder of the pixels are assigned a zero charge. A potential distribution field (400) which results from the interaction of the boundary voltages with the pattern of charges is determined by numerically solving a two-dimensional Poison's equation. Each contiguous path (306) of steepest potential gradient from one boundary (304) to opposing boundary (302) forms a demarcation line along which the image is segmented. Each resulting segmented image (500) is stored as an individual file for subsequent processing.

16 Claims, 10 Drawing Sheets

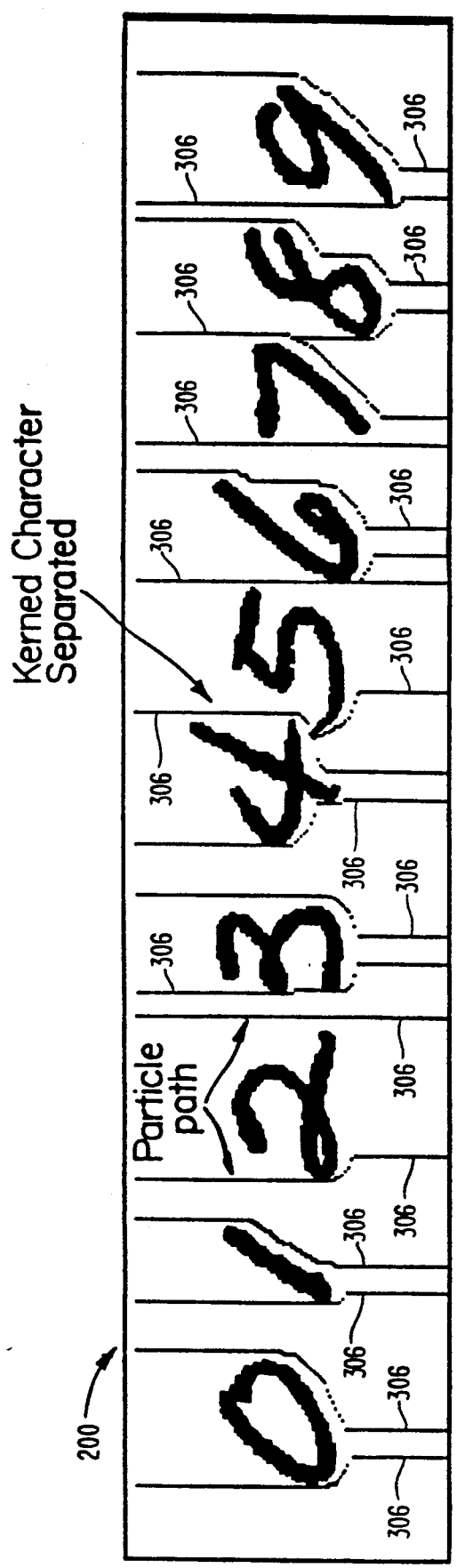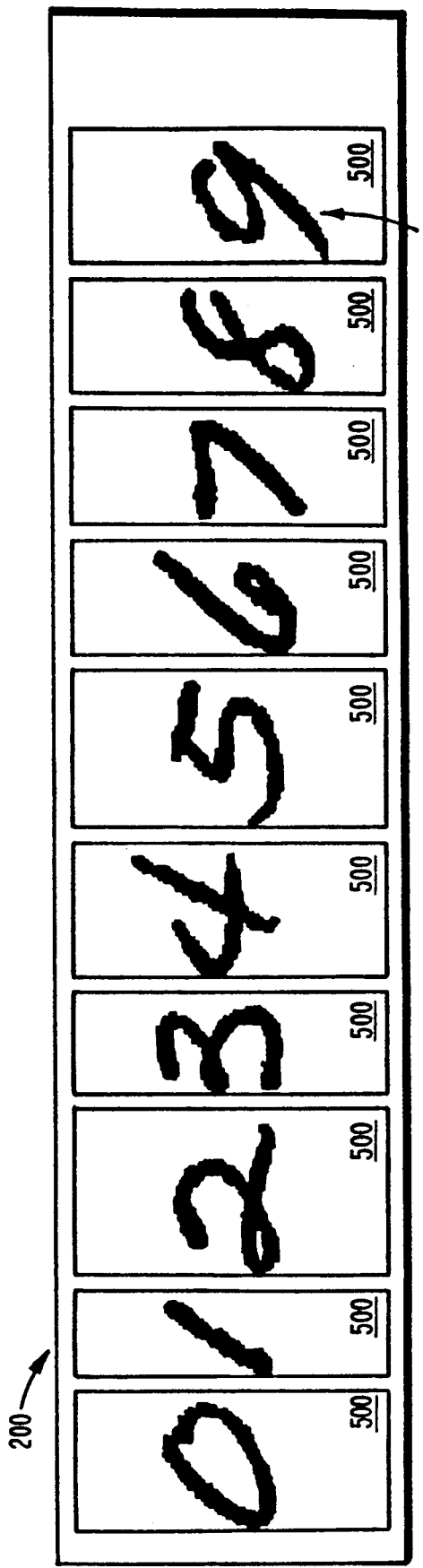
FIG. 5
FIG. 7

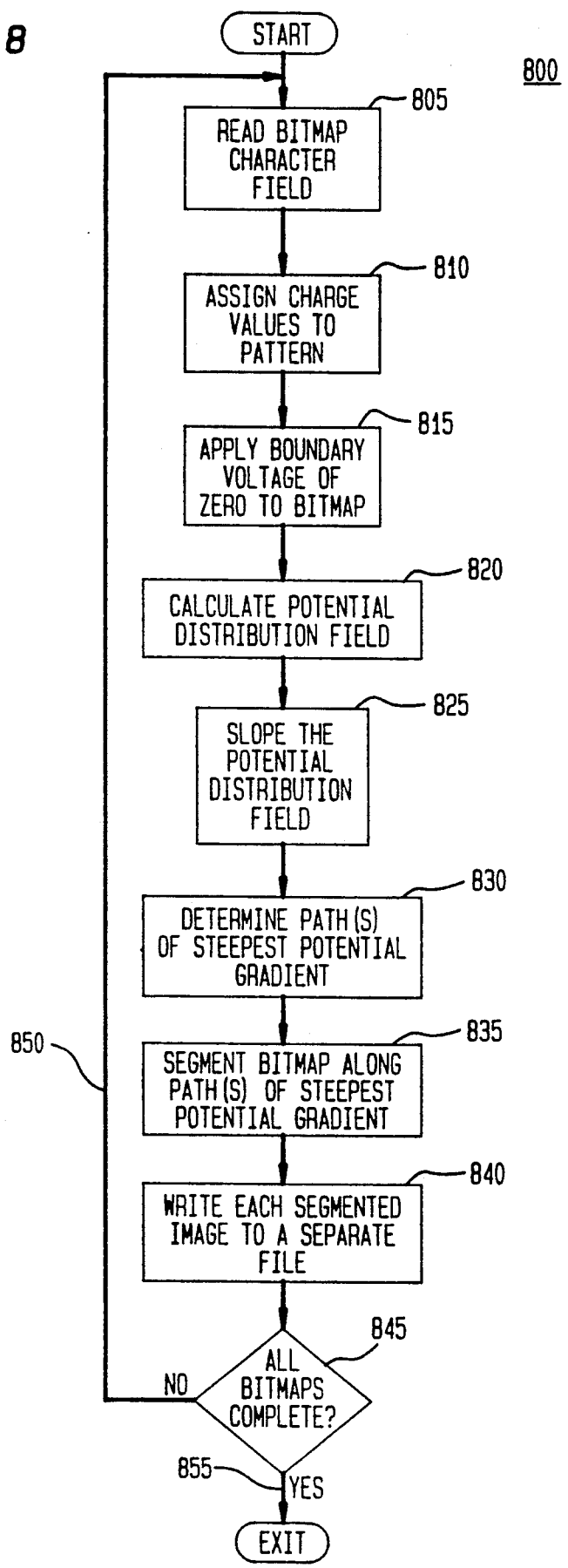

BITMAP IMAGE SEGMENTATION USING A CHARGE MODEL FOR PIXELS

DISCLAIMER TO CERTAIN COPYRIGHT PROTECTION

A portion of the disclosure of this patent document contains material that is subject to copyright protection. The copyright ownerhas no objection to the facsimile reproduction of the patent disclosure as it appears in the Patent and Trademark Office patent files or records, but otherwise reserves all copyright rights whatsoever.

1. Technical Field of the Invention

The invention relates to method and apparatus for accomplishing bitmap pattern recognition, and particularly, to a method and apparatus for segmenting a bitmap image using a charge model for pixels that comprise a bitmap image.

2. Background Art

In general, image processing involves a series of processing steps which capture an image, digitize the captured image into a bitmap, process the image by applying various selection criteria to extract desirable information from the image, and output the extracted information. An original image may be supplied from any of many different sources, including video cameras, still photographs, infra-red sensor images, textual documents and the like.

Typically, in an effort to extract as much information as possible from a given image, an information extracton process begins by increasing an information-to-noise ratio associated with the image. If the desired information resides in a number of small objects within the image, the remaining objects in the image are considered background noise. To facilitate limiting the amount of background noise that must be contended with during processing and, thus increasing the information-to-noise ratio, an image is oftentimes segmented into small areas each containing an object instilled with desired information. Each small segment contains an object of interest and a relatively small amount of surrounding background; therefore, the background noise is limited and the information carrying object will be more prominent over the background noise. Image processing, regardless of whether the image to be processed is text, a video image, or a photograph, generally requires some degree of image segmentation to facilitate the extraction of as much useful information as possible from the image.

In some instances, segmentation is necessary because an image processor can only handle a limited amount of data at one time. Therefore, segmenting the image into small data files enables the image processor which may not be able to process a full image at one time, to process the full image by successively processing small portions thereof.

In other applications, segmentation is used to parallel process a number of segments simultaneously. Parallel processing allows the image to be processed faster than that which would occur if a single processor were to process an entire image on a segment-by-segment basis. Additionally, processors in a parallel processing system can use specifically tailored algorithms to enhance extraction of information from a given segment. For example, a segment that contains an excessive amount of background noise can be sent to a specialized processor designed for extracting information from segments that contain high noise content. This individualized processing can extract information which would otherwise not be recovered by a system using a single information extraction algorithm. Furthermore, accuracy of the extracted information improves in comparison to single algorithm systems when the segment processing algorithms are matched to the type of information desired to be extracted, i.e., using, for example, matched filtering techniques.

The increased image processing speed and accuracy that result from segmenting an image before the image is processed is desirable in a wide spectrum of image processing applications, including for example automated aerial photograph analysis, x-ray and computer tomography (CT) scan analysis, and optical character recognition.

Optical character recognition poses various unique problems to which segmentation can be applied. Specifically, in optical character recognition systems, an image is captured and digitized by an electro-mechanical scanner. The electro-mechanical scanner converts the image, i.e., a page of text, into a bitmap image consisting of a matrix of pixels where each pixel is either black or white. Typically, the arrangement of black pixels forms a pattern that resembles the text of an original document.

Subsequently, a processing algorithm analyzes the bitmap image to determine the specific characters that form the text. A character is generally defined as any letter, number, or symbol that regularly appears in a textual document. The simplest form of a character recognition algorithm involves systematically comparing the bitmap image to a series of fixed character templates. However, to segment handwritten characters that are usually not uniformly drawn, an increasingly complex process is typically used through which the shape and size of each template are slightly varied so as to conform the template to the handwritten character. Thereafter, the templates are sequentially compared to the bitmap character until an approximate match is found. The character is deemed recognized by the optical character recognition system as the character represented by a matching template. To permit subsequent computer recognition and manipulation of the character, the recognized character is stored in memory as an equivalent ASCII character corresponding to the template.

Raw data from the scanner usually is in the form of an image consisting of strings of bitmapped characters. Optical character recognition algorithms using the template match system, or a similar system, require a separate bitmap image of each individual character; otherwise, a template would have to match an entire string of characters, a formidable and time consuming task. Therefore, to facilitate character recognition, the individual bitmapped characters in a given string must be segmented, i.e., separated, before applying the character recognition algorithm.

The segmentation process for use in optical character recognition is complicated by a variety of characteristics unique to handwritten characters. These characteristics unduly complicate a character recognition algorithm, particularly where a template comparison process is used. These characteristics include non-uniform characters and spacing therebetween, non-uniform stroke thickness, touching characters within a given string, and kerning, i.e., where a straight vertical line cannot be drawn between two adjacent characters in a string.

Conventional segmentation methods attempt to solve all of the complications at once, and hence, are complex and computationally intensive. One conventional segmentation method estimates character pitch for each character in a character string. Generally, joined characters are connected by thin pitch lines. Therefore, the character string is segmented at locations where the pitch is thin compared to the average pitch in the body of the characters. The character pitch estimation segmentation technique as well as other conventional segmentation techniques are discussed in D.G. Elliman and I.T. Lancaster, A Review of Segmentation and Contextual Analysis Techniques for Text Recognition, *Pattern Recognition*, Vol. 23, No. 3/4, 1990, pages 337-346. Generally, the conventional techniques attempt to provide algorithms that are capable of segmenting handwritten characters that contain all of problematic characteristics delineated above. Typically, they accomplish unnecessary processing when faced with character strings having simple string structures, i.e., no joined or touching characters.

Therefore, a specific need exists in the art for a relatively simple method and apparatus that segment character strings, that contain distinct and separate characters, in an efficient, automated manner.

DISCLOSURE OF THE INVENTION

Accordingly, an object of the present invention is to provide a method and apparatus for segmenting bitmap images that contain distinct and separate objects.

A specific object is to provide a method and apparatus in an optical character recognition system for segmenting bitmap character strings that contain distinct and separate handwritten characters.

Another specific object is to provide such a method and apparatus that is relatively simple and can efficiently operate in an automated manner.

These and other objects are accomplished in accordance with the teachings of the present invention by modeling a bitmap image that is to be segmented as a parallel plate capacitor. In so doing, boundaries of the bitmap image are each assigned a voltage value; each pixel within the bitmap image is assigned a charge value. Generally, a positive charge is assigned to the pixels which comprise a pattern in the bitmap image; all the remaining pixels are assigned a zero charge. A potential distribution which results from an interaction of boundary voltages with the pattern of charges can be determined by numerically solving a two-dimensional Poisson's equation. Each contiguous path of steepest potential gradient from one boundary of the image to an opposing boundary that passes between image objects forms a demarcation line along which the image is segmented. Each resulting segmented image is stored as an individual file for subsequent processing.

BRIEF DESCRIPTION OF THE DRAWINGS

The teachings of the present invention may be readily understood by considering the following detailed description in conjunction with the accompanying drawings, in which:

FIG. 5 depicts hypothetical paths of positively charged particles following a path of steepest potential gradient through a potential distribution field;

Figure 6A:
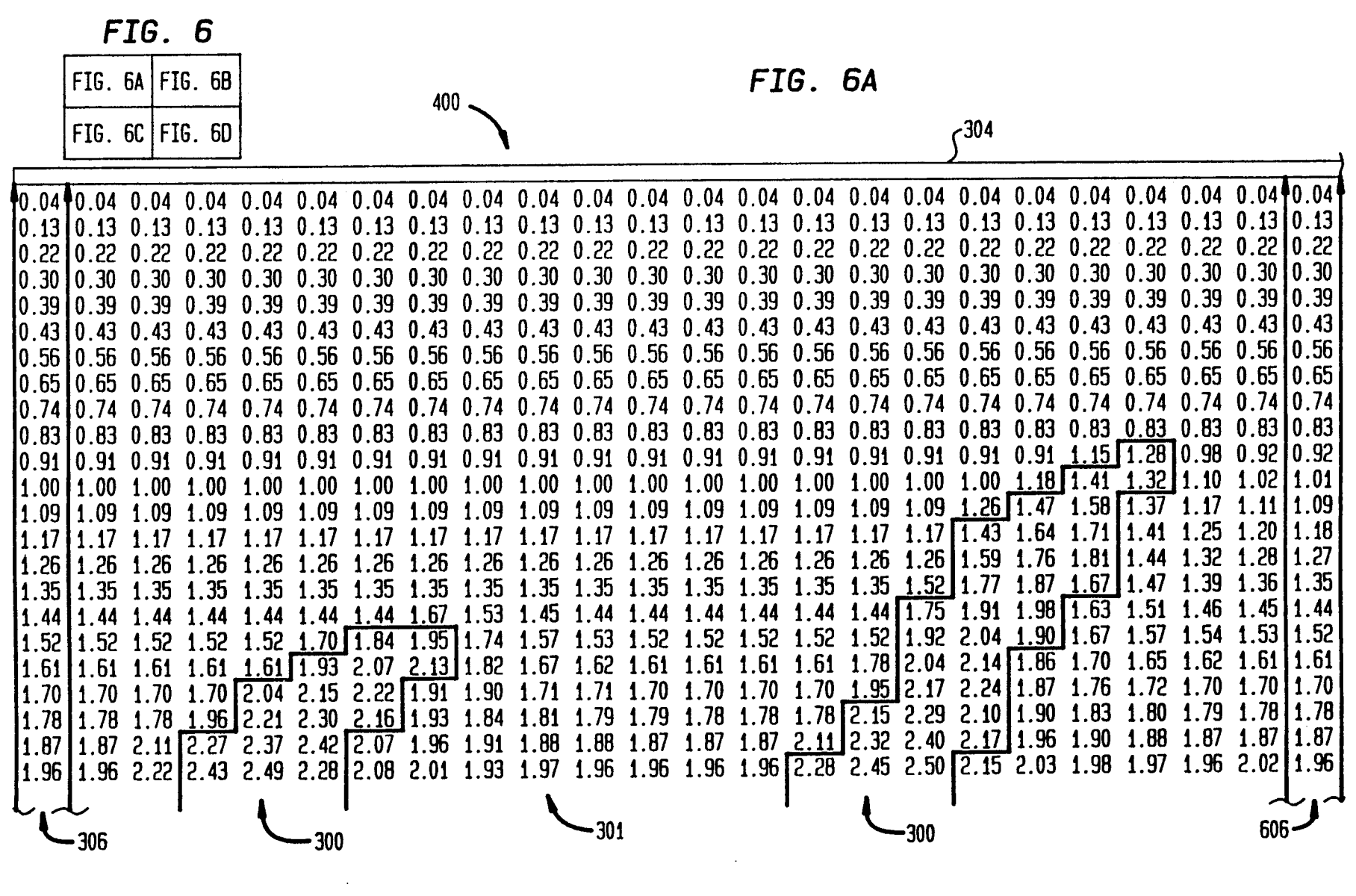
Figure 6B:
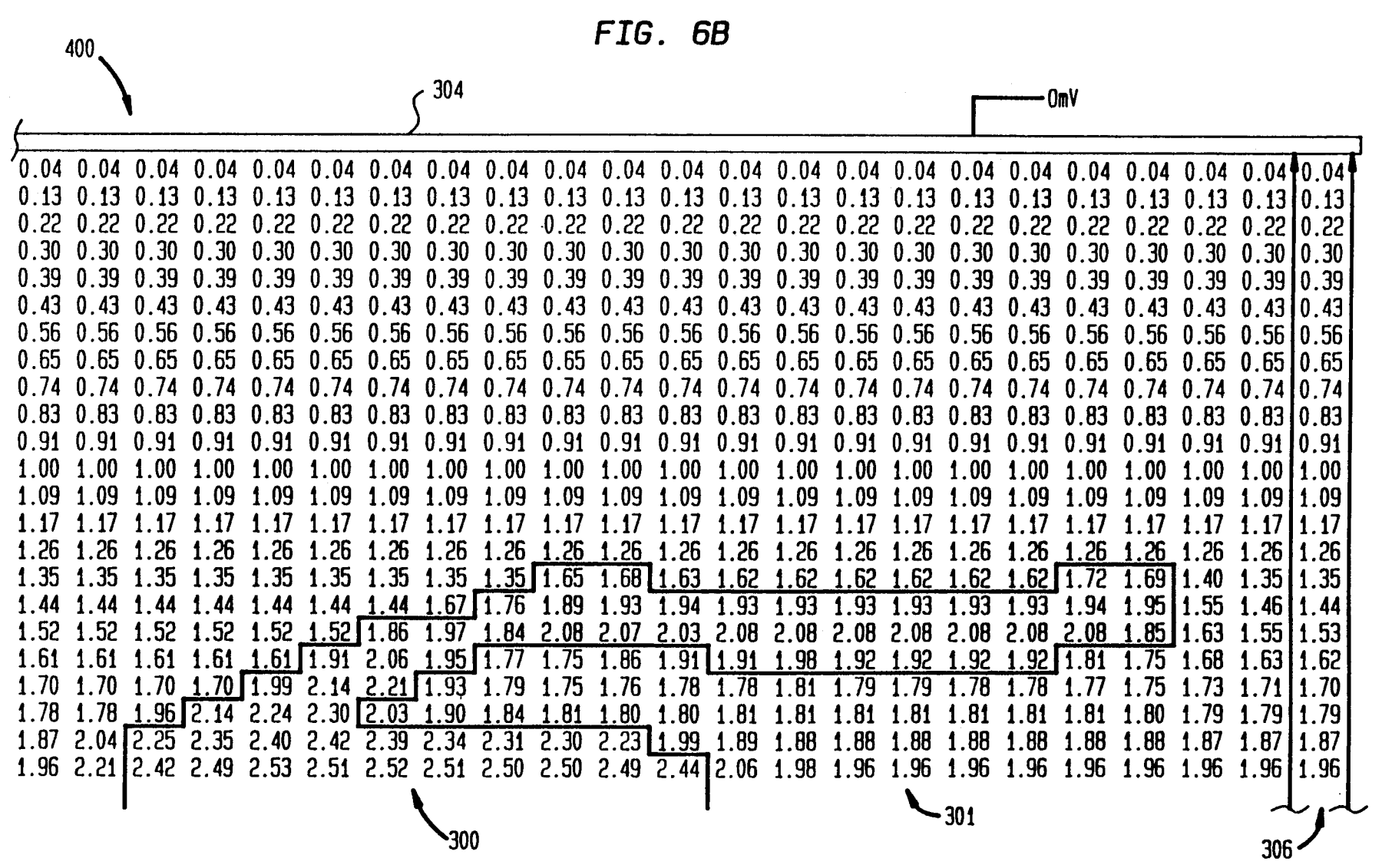
Figure 6C:
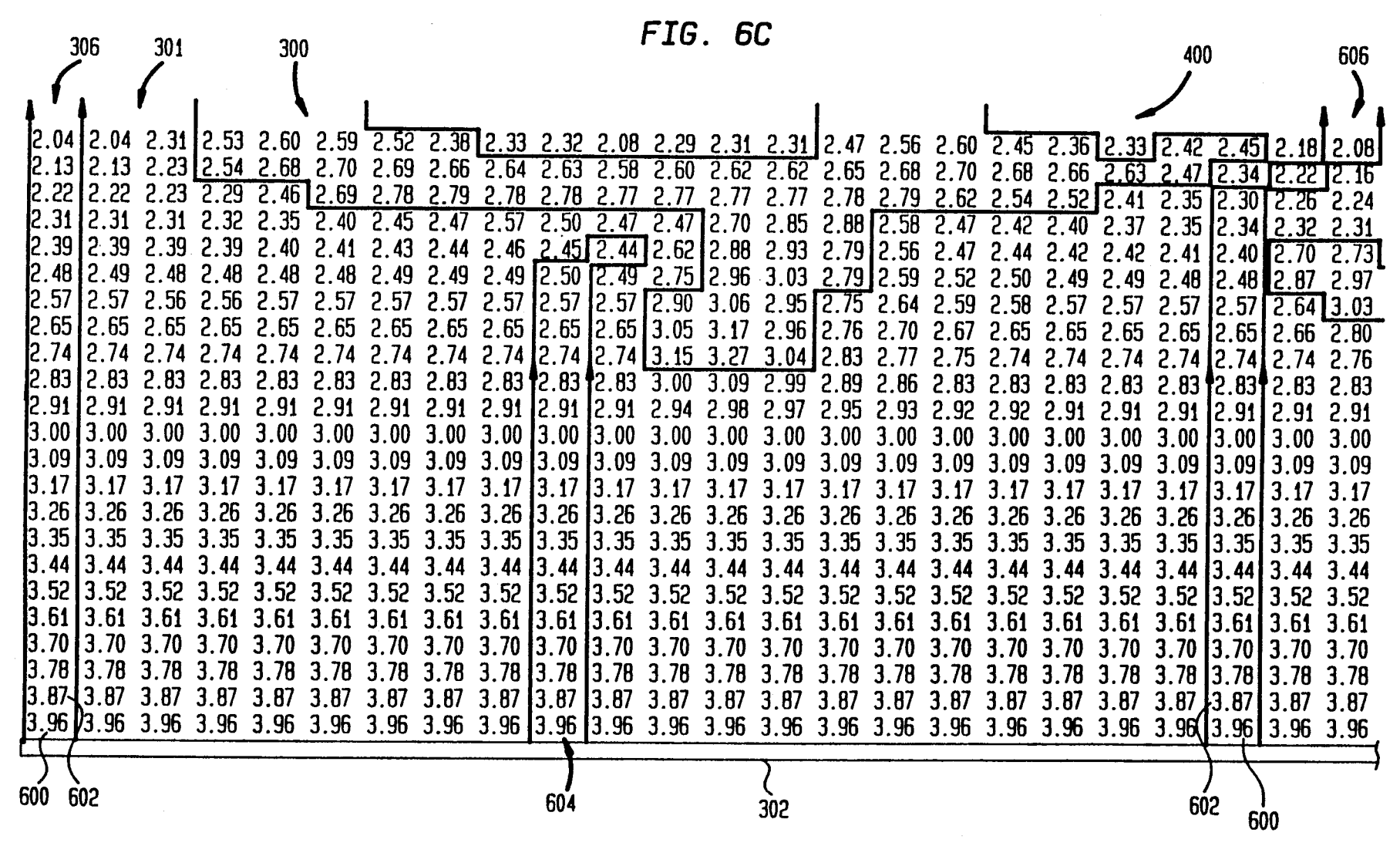
Figure 6D:
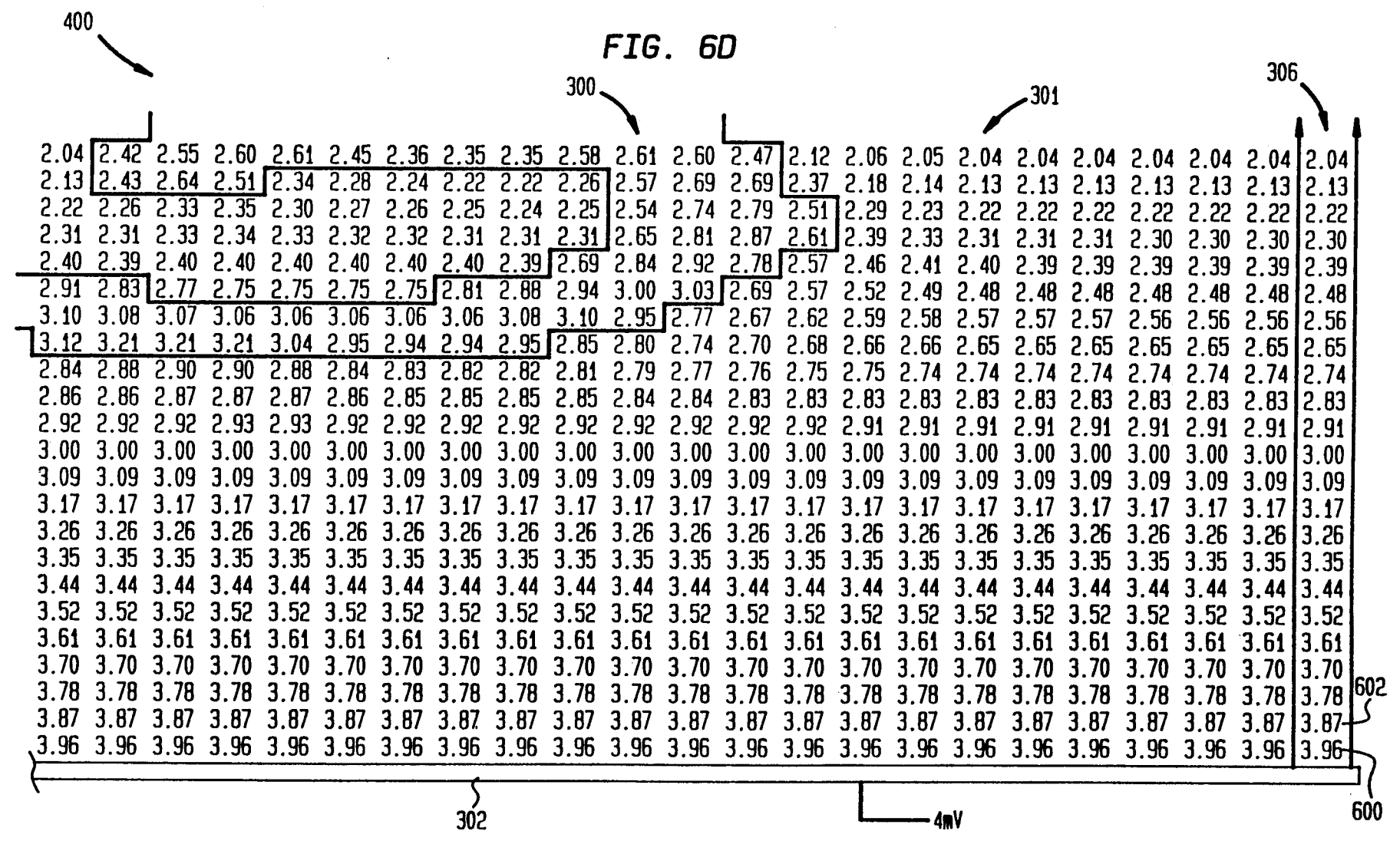

FIG. 6 shows the arrangement of FIGS. 6A through 6D;

FIGS. 6A through 6D, taken together, depict a potential distribution field comprised of a matrix of pixels having a charge value at each pixel location calculated in accordance with the teachings of the invention;

FIG. 7 depicts segmented bitmap images that have been segmented along paths 306 depicted in FIG. 5 in accordance with the teachings of the invention;

FIG. 8 is a flow chart representing the inventive method for accomplishing segmentation of a bitmap image.

To facilitate understanding, identical reference numerals have been used, where possible, to denote identical elements that are common to various figures.

MODES OF CARRYING OUT THE INVENTION

After reading the following description, those skilled in the art will readily appreciate that the inventive bitmap segmentation method can be used in a wide variety of applications for segmenting bitmap images. For example, one such illustrative application might include segmenting a bitmap of a handwritten character string to facilitate processing the string by an optical character recognition system. This illustrative application is the focus of the following description.

A. Overall Apparatus Description

Figure 1:
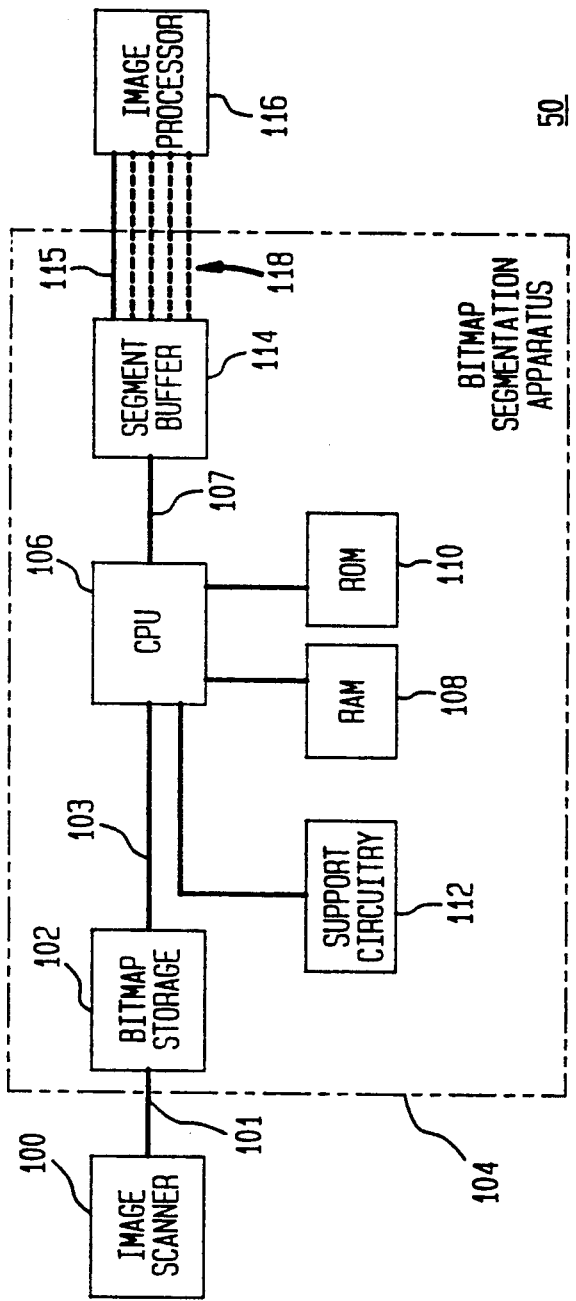
FIG. 1 depicts a block diagram of an embodiment of an image processing system utilizing a bitmap image segmentation method in accordance with the teachings of the present invention.

FIG. 1 depicts a block diagram of one embodiment of bitmap segmentation apparatus utilizing the inventive method, for use in, image processing system 50. In essence, the inventive method divides a previously bitmapped image into segments. Each image segment can be subsequently processed either in parallel fashion to enhance processing speed, or individually to tailor the processing to each individual segment and enhance accuracy.

Specifically, image processing system 50 contains image scanner 100 which generates a bitmap image from an original image. Each bitmap image is passed, via line 10I, to bitmap segmentation apparatus 104 which separates the bitmap image into constituent image segments along logically derived demarcation lines. Subsequently, each image segment is sent, via lines 115 and 118, to image processor 116 which individually processes each segment to extract information therefrom.

Bitmap segmentation apparatus 104 can be implemented using a personal computer, computer workstation, or other computer system. Generally, image scanner 100 is a stand alone hardware unit; image processor 116 is a software package running on dedicated image processing circuitry or, alternatively, sharing the same microprocessor as is used in bitmap segmentation apparatus 104.

More specifically, image scanner 100 converts a given image, such as a text document, x-ray image, or photograph into a bitmap image. Image scanner 100 will commonly incorporate a rudimentary image processing capability, such as variable thresholding, to ensure proper bitmap image contrast and sharpness. Generally, a bitmap image consists of a matrix of pixels where each pixel is either black or white. The arrangement of black pixels forms a pattern that resembles the original image. By properly selecting a scanning threshold, certain features of the image can be made to stand out from the background noise, for example, tumors in a mammogram, bones in an x-ray, buildings in an aerial photograph, and writing on paper.

The resulting bitmap image produced by scanner 100 is routed, via line 10I, to and stored within memory device 102, such as a hard disk or integrated circuit random access memory, within bitmap segmentation apparatus 104. However, storage device 102 could an integral part of image scanner 100. Central processing unit (CPU) 106 performs segmentation upon each bitmap image retrieved, via line 103, from storage device 102. CPU 106 is a conventional microprocessor supported by standard hardware such as random access memory (RAM) 108, read only memory (ROM) 110, and general support circuitry 112, e.g., a power supply, a clock, and other such circuitry all of which is not specifically shown. Segment buffer 114 connects, by line 107, to CPU 106 and provides temporary storage of the segmented images as individual files in a memory device, such as an integrated circuit RAM or a hard disk. Segment buffer 114 is generally an integral part of bitmap segmentation apparatus 104. Buffer 114 can be an integral part of image processor 116. Depending on system configuration and user application, each image file may be accessed by image processor 116 either serially via line 115, or in parallel as indicated by dashed lines 118.

Image processor 116 processes each image segment to extract information therefrom. For example, in an optical character recognition system, image processor 116 will determine what ASCII character best matches the character represented in each bitmap image segment. Generally, the matching process is accomplished by comparing each bitmap image segment to a series of templates until a matching template is found. The ASCII character, or an equivalent character standard, corresponding to the matching template is selected to represent the character in the bitmap image segment. By repeating the matching process for all the characters in a document, the entire document can be converted from a series of bitmap images into a computer compatible ASCII file.

Figure 2:
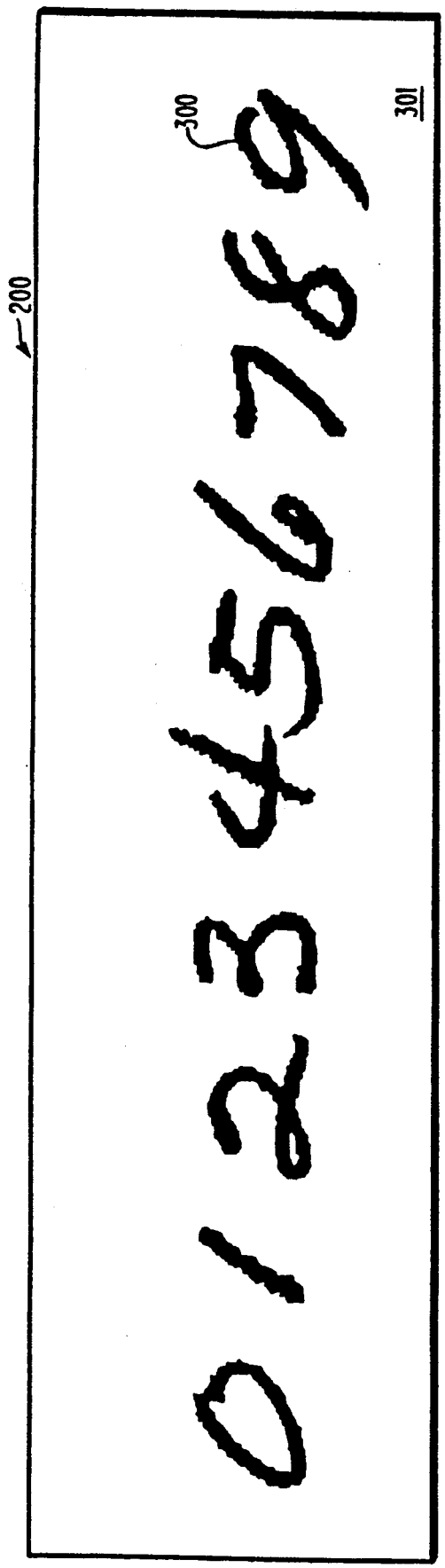
FIG. 2 depicts an illustrative bitmap image of a handwritten character string.

FIG. 2 depicts a portion of a bitmap page generated by scanner 100 and stored in storage device 102. The illustrative image contains string 200 of handwritten characters, here shown as numbers. For now, the inventive segmentation process will be described with respect to string 200.

As is generally the case with handwritten characters, the characters depicted are not evenly spaced nor consistently sized. Additionally, some of the characters kern, i.e., are oriented such that a straight line can not be drawn to separate them. A dramatic example of kerning occurs between characters 4 and 5. Kerning is one of the most difficult segmentation problems which arise when handwritten characters are being segmented.

To segment character string 200, the present invention uses a novel mathematical modeling approach. Specifically, a bitmap image, illustratively, character string 200, is modeled as a two-dimensional dielectric containing charged particles and bounded by fixed voltages.

Figure 3:
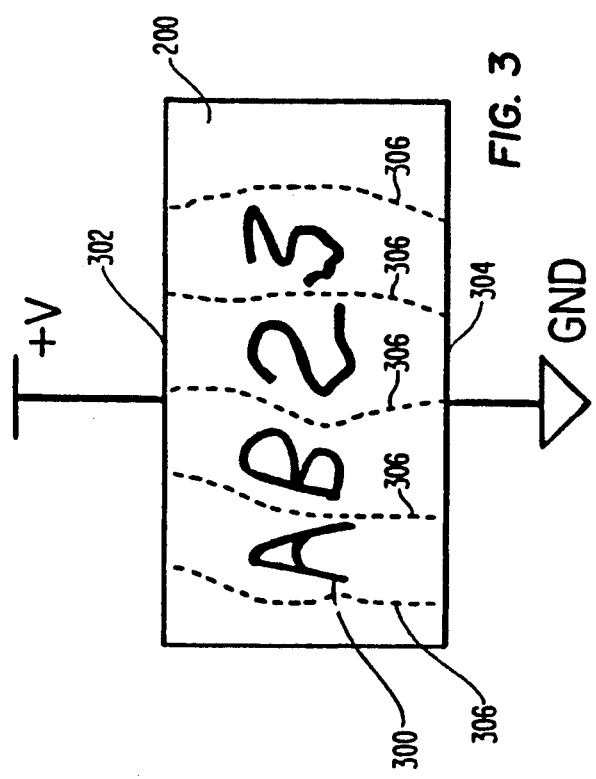
FIG. 3 depicts a charge model used to segment a bitmap image in accordance with the teachings of the present invention.

FIG. 3 schematically depicts this model. In general, bitmap image 200 is assigned an arbitrary dielectric constant. Each pixel of pattern 300, i.e., the black pixels, are assigned an arbitrary positive charge value. The non-black (white) pixels 301 are assigned a different charge value, typically zero, than that assigned to the black pixels. An arbitrary voltage differential, shown as $+V$, is assumed to be placed across the dielectric, specifically, between anode 302 and cathode 304. In essence, a parallel plate capacitor is being modeled.

Alternatively, positive and negative charges can be assigned to the pattern pixels and to the image boundaries, respectively. Of course, various combinations of charge values and voltages can also be used.

Theoretically, positively charged particles will be modeled as passing from the positive potential of anode 302 to the zero potential on grounded cathode 304 along the path of lowest resistance, i.e., a path of steepest potential gradient. In a parallel plate capacitor having a uniform dielectric between the plates, the path of each particle is generally along a straight line from the anode to cathode. However, by introducing the positive charges at each pattern pixel 300, each particle path between $+V$ and ground will be altered to avoid a high positive potential associated with each such pattern pixel. The altered particle paths are depicted as dashed lines 306. Consequently, the particle paths conform to the contours of a potential distribution resulting from the interaction of the boundary voltage values with the charged pixels.

The potential distribution between the plates is determined by solving the following two-dimensional Poisson's equation as given in equation (1) below:

$$\frac{\partial^2 V}{\partial x^2} + \frac{\partial^2 V}{\partial y^2} = -\frac{\rho}{\epsilon} \tag{1}$$

where:

the potential at any location (x,y) within bitmap image 200;

$\epsilon$ is a dielectric constant assigned to bitmap image 200; and $\rho$ is the charge value assigned to each pixel in pattern 300.

The boundary values used to determine a unique solution to equation (1) are the applied voltages $+V$ and zero.

A numerical solution of equation (1) is most easily found using the discrete solution form, as embodied in equation (2) below:

$$-4v_{i,j} + v_{i-1,j} + v_{i+1,j} + v_{i,j-1} + v_{i,j+1} = -\frac{\rho}{\epsilon} \tag{2}$$

Equation (2) forms a sparse system of m x n equations where m and n are the width and height of the bitmap image, as measured in pixels. The numerical solution to the system of equations represented by equation (2) determines the potential at any pixel location (i,j) within the bitmap image. Consequently, a potential value is determined for each pixel in bitmap image 200.

There are many methods known in the art for solving a boundary value problem modeled as a system of linear equations. Two common methods used are Liebmann's method and successive over relaxation (SOR) method. In that regard, see C.F. Gerald et al, *Applied Numerical Analysis*, 3rd ed., 1985, pages 399-454 for a comprehensive review of solution methods applicable to solving Poisson's equation.

Figure 4:
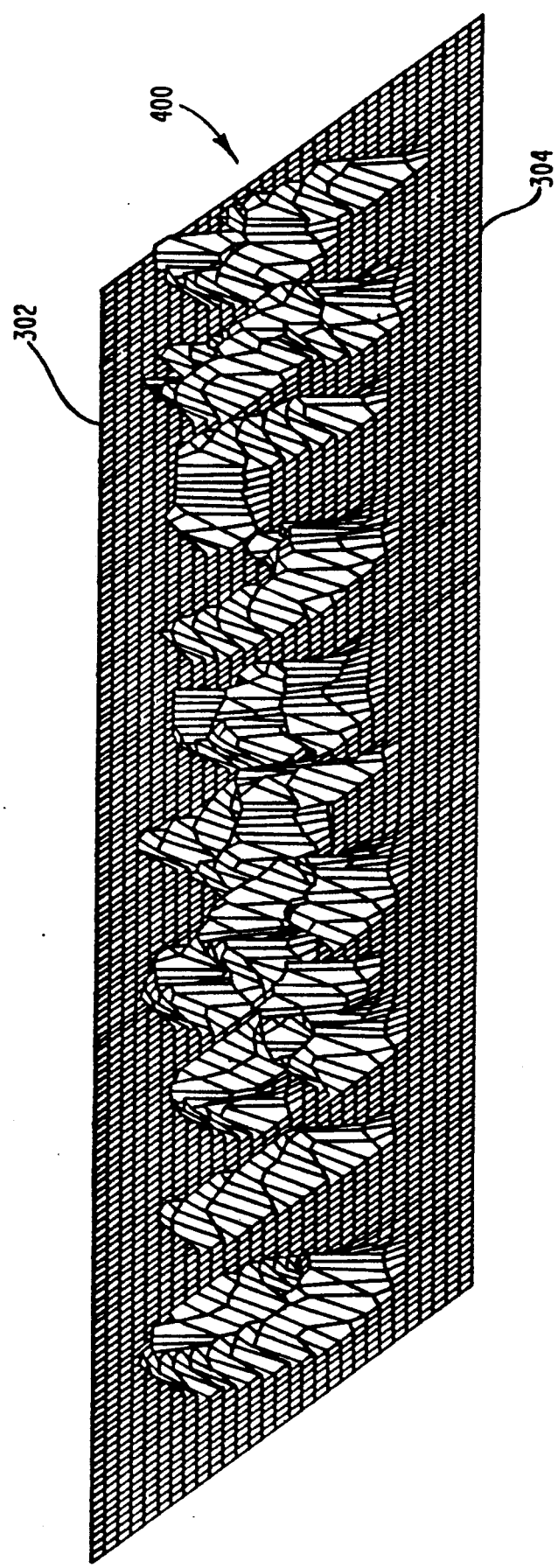
FIG. 4 depicts a potential distribution associated with the bitmap image shown in FIG. 2 and which results from utilizing the charge model.

FIG. 4 graphically depicts a solution to equation (2) using the SOR method. To generate potential distribution field 400, bitmap string 200 containing 47,808 pixels arranged in 96 rows and 498 columns is retrieved from storage device 102. Each black pixel is assigned a 0.5 mV charge value. As is expected, potential distribution field 400 has a maximum positive potential at each charged pixel and becomes decreasingly positive farther therefrom. As depicted, each charged pixel affects the potential in the neighboring pixels thereby resulting in distribution field 400. To make the positive peaks prominent, distribution field 400 was calculated using a voltage of zero on both cathode 304 and anode 302. If a positive voltage is applied to anode 302, the entire image is uniformly sloped from anode 302 having a positive potential towards cathode 304 having a potential of zero.

To segment the bitmap image, path(s) of steepest potential gradient from anode 302 to cathode 304 that passes between adjacent characters is determined, and the segmentation is accomplished along this path.

FIG. 5 depicts illustrative paths 306 that a positively charged particle would take while traversing bitmap image 200.

FIGS. 6A-6D collectively show a detailed view of a sub-section of potential distribution field 400 of string 200 depicted in FIG. 4; the correct alignment of FIGS. 6A-6D is shown in FIG. 6. Specifically, FIGS. 6A-6D show the area surrounding numbers "4" and "5", the characters that kern. To enable this specific area to be presented in an understandable form, only every other column of actual calculated data is shown.

To determine paths 306, all of the pixels in potential distribution field 400 of FIG. 4 are weighted by an applied voltage between anode 302 and cathode 304. The weighting, i.e., an incremental increase in potential added to each row of pixels in potential distribution field 400, uniformly slopes distribution field 400 from the boundary having the highest positive potential, i.e., anode 304 to the boundary having the lowest potential, i.e., cathode 302. Specifically, FIGS. 6A-6D show that by applying 4 mV to anode 302 and 0 mV to cathode 304, each row of pixels in distribution field 400 differs from the pixels in rows above and below it by 0.09 mV.

The slope inherently occurs within the modeled dielectric when each of the two opposing boundaries are assigned differing voltage values and equation (1) is solved. However, to ease the programming task of solving this equation for applied boundary voltages, the solution is determined in two steps. Specifically, first, the solution to equation (1) is determined using zero boundary voltage. Second, a distribution field generated as a solution in the first step is weighted by adding an incremental value to each pixel to create a sloped distribution field.

Subsequently, each pixel along anode 302 is sequentially used as a particle origination point, the inventive method determines which neighboring pixel has the least potential in comparison to the potential of the current pixel, i.e., the direction of steepest potential gradient, and proceeds to move the particle to the neighboring pixel having the least potential. If two neighboring pixels have the same potential, the method chooses the pixel that moves the particle closest to cathode 304, i.e., the pixel directly above the current pixel would be chosen over the pixel at a diagonal from the present pixel. As successive application of the method progresses the particle from pixel to pixel, a sequence of pixel locations is generated that defines a path of steepest potential gradient.

For example, paths 306 and 606 in FIGS. 6A-D are formed by the inventive method by starting at pixel 600 adjacent to anode 302. Starting pixel 600 has a value of 3.96 mV. Two neighboring pixels have values of 3.87 mV; however, for the reasons discussed above, the pixel directly above pixel 600 is selected. The process moves the hypothetical particle to chosen pixel location 602 and repeats the method of pixel selection. The method repeats until a neighboring pixel having a lesser value than the current pixel cannot be found. This occurs when either the particle enters a pocket of higher charged particles near pattern 300, illustrated by path 604, or when the particle reaches the opposing boundary (cathode 304), illustrated by paths 306 and 606. In either instance, the next pixel along anode 302 is processed until all of the pixels along anode 302 have been used as particle originating points. The use of this inventive method will determine a path between any two disjoint characters. Importantly, the method provides path 606 which passes between two kerned characters.

To visualize the process, assume a ball is allowed to roll from starting pixel 600 adjacent to anode 302 towards cathode 304. The ball will choose a path of least resistance, i.e., steepest downward gradient, along which to travel. The same process is at work when a path of steepest potential gradient is sought by a positively charged particle. The path of steepest potential gradient which takes the least number of pixel processing steps to travel from anode 302 to cathode 304 is that which determines the segmentation line between two adjacent characters.

FIG. 7 depicts the resultant individual bitmap images 500 after segmentation is complete. Each segment image bitmap 500 is stored individually for subsequent processing.

Due to the repetitive numerical processing necessary to accomplish the forgoing segmentation, the inventive method is easily written as a computer program for execution by a microprocessor.

FIG. 8 depicts a high level flow chart of the inventive segmentation process as it would be embodied in software. The actual code for performing the segmentation appears as APPENDIX I below.

Upon entry into process 800, execution proceeds to step 805 which, when executed, reads the bitmap character field. The charge values are then assigned at step 810 to each pixel that is part of the pattern in the bitmap image. The boundary voltages are set to zero at step 815. Using the boundary voltages of zero and the pixel charge values as parameters, equation (1) is numerically solved using equation (2) at step 820. The result is a potential value for each pixel in the bitmap image which, taken in its entirety, defines a potential distribution field.

At step 825, the entire potential distribution field is sloped by adding potential values to each row of pixels starting at the cathode boundary and proceeding to the anode boundary. The potential values are incrementally increased for each successive row to generate the sloped potential distribution field. The foregoing process of calculating a sloped potential distribution field is accomplished in two steps; specifically, solving Poisson's equation with zero voltage boundary values and, second, applying the weighting values, to ease the programming task. As is obvious to those skilled in the art, the two steps can be combined and Poisson's equation can be solved using non-zero boundary voltages to inherently slope the potential distribution field.

At step 830, a path having the steepest potential gradient between boundary voltages is determined by tracing a particle path through the field from anode to cathode. Each pixel along the anode is sequentially used as a particle origination point. The inventive method determines which neighboring pixel has the least positive potential in comparison to the potential of the current pixel, i.e., the direction of the steepest potential gradient, and proceeds to move the particle to that pixel. If two neighboring pixels have the same value, the method chooses the pixel that moves the particle closest to cathode, i.e., the pixel directly above the current pixel would be chosen over the pixel at a diagonal from the present pixel. As successive application of the method progresses the particle from pixel to pixel, a sequence of pixel locations is generated that defines a path of steepest potential gradient. Each path of steepest potential gradient which takes the least number of pixel processing steps to travel from anode to cathode is selected as segmentation lines between adjacent characters.

Subsequently, at step 835, the bitmap image is segmented between characters along the paths of steepest potential gradient found in step 830. Each segmented image is written to a separate file at step 840. The segmented image files may be either stored for recovery and processing at a later date or sent directly to image processor 116 shown in FIG. 1, after segmentation. At step 845 shown in FIG. 8, a determination is made as to whether all the bitmap images are complete, i.e., all the rows of characters on a page have been processed. If all the characters have not been processed, the process repeats by looping back, via NO path 850 emanating from decision block 845, to block 805 to segment, for example, the next line of text from a scanned document and so on. Alternatively, if all the bitmap images stored in memory have been segmented, operation exits from the process, via the YES path 855 emanating from decision block 845 at block 855.

Figure 9:
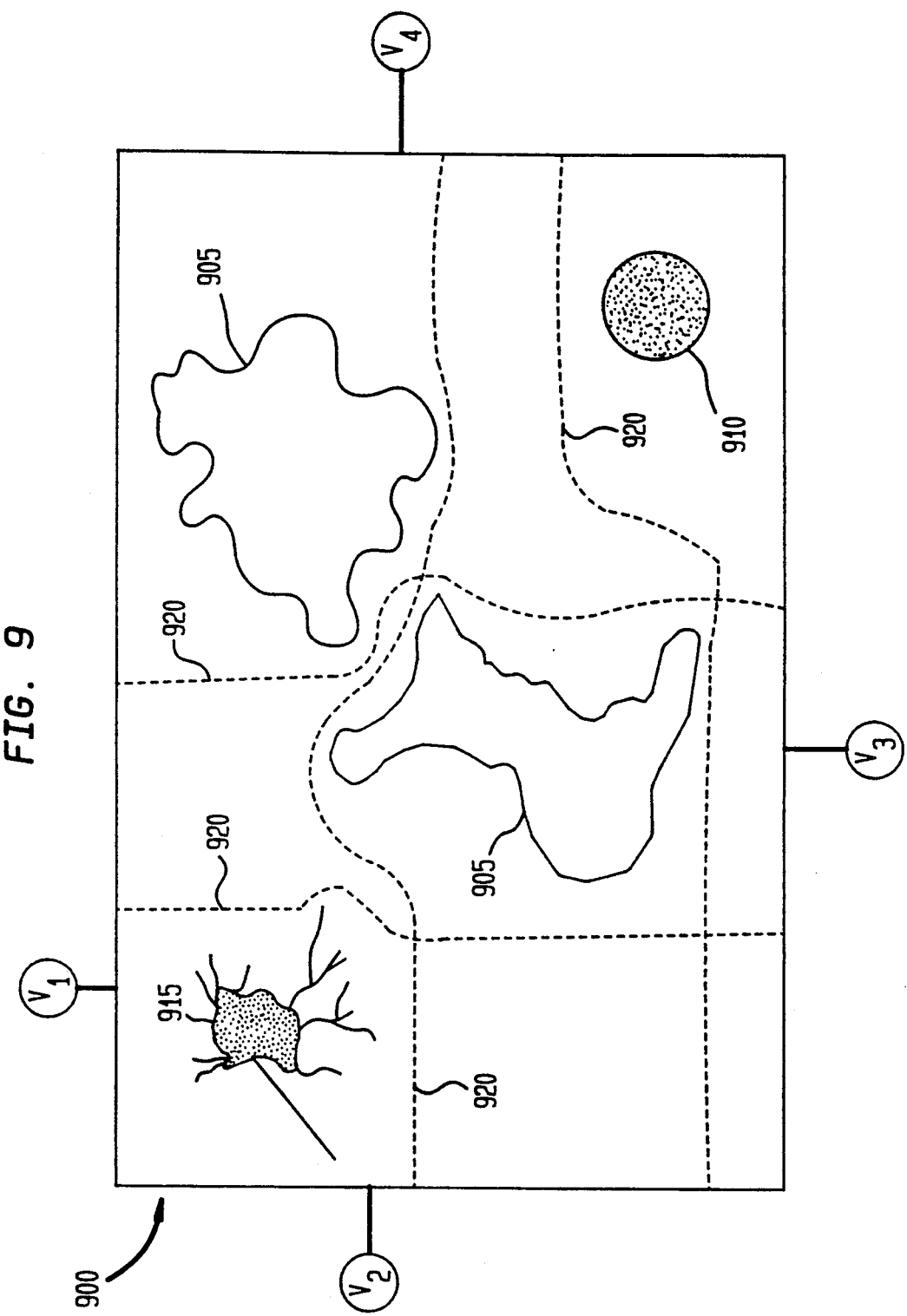
FIG. 9 depicts a charge model in accordance with an alternative embodiment of the invention for segmenting bitmap images having a general form.

Furthermore, while the foregoing character string segmentation process required each bitmap image to be segmented only along a vertical path, the inventive segmentation method can be used to segment an image in both vertical and horizontal directions. In this regard and as an alternative embodiment, FIG. 9 depicts an illustrative charge model showing various types of image areas in a single bitmap image. The foregoing inventive process has many applications other than the segmenting handwritten character strings. Hence, FIG. 9 represents a small area of a mammogram 900 where large areas 905 represent soft tissue, circular area 910 represents a benign tumor, and spiculated area 915 represents a cancerous tumor. To segment this image, the pixels in black areas are assigned negative charge values and four different boundary voltages, $V_1$ through $V_4$, are applied in opposing pairs to the image boundaries. The numerical solution to Poisson's equation will generate a potential distribution fields for each voltage pair similar to the field in FIG. 4. To determine the vertical and horizontal lines of steepest potential gradient, the process of tracing the particle paths must be accomplished twice, once along the vertical axis and once along the horizontal axis. Illustrative steepest potential gradient paths are shown as dashed lines 920 in FIG. 9. The bitmap image is segmented along these lines to isolate each region needing further image processing, i.e., the spiculated area 915.

As the mammogram example indicates, even though the invention has been described in detail in terms of a system for segmenting bitmap images of handwritten characters, the inventive bitmap image segmentation apparatus can be used in any system where image segmentation is necessary or desired to improve image processing. Other applications illustratively include, but are not limited to computerized tomography (CT) scan analysis, x-ray analysis, photograph analysis, and other forms of image analysis.

Although two embodiments of the present invention have been shown and described in detail herein, many other varied embodiments that incorporate the teachings of the invention may be easily constructed by those skilled in the art.

INDUSTRIAL APPLICABILITY AND ADVANTAGES

The present invention is useful in image segmentation apparatus and generally in systems for image processing. Advantageously, the invention provides an automated method and apparatus for segmenting bitmap images that is simpler than those previously obtainable in the art.

Appendix I

Source code listings for the programs used for bitmap segmentation follow. The functions listed are :

*main()*
*split_bitmap()*
*trace_path()*
*empty_bitmap_section()*
*simple_relax()*
*apply_slope()*
*init_graphic_window()*
*display_bitmap()*
*handle_user_input()*
*write_bitmaps()*

Computer requirements

The programs below have been tested on a Sun Sparcstation 2 running SunOS 4.1.1 with X-Windows Version 11, Revision 4. They are expected to work without substantial modification on any Unix-based workstation with X Windows. The unsegmented bitmaps are assumed to be in the format distributed by the National Institute of Standards & Technology, but other formats can be accomodated with minor modifications.

```
/*
******************************************************************
**                                            *
**           Copyright (c) 1990 by              *
**      Eastman Kodak Company, Rochester, NY      *
**           All Rights Reserved               *
******************************************************************

Author:   Arun Rao

Eastman Kodak Company
    Rochester, NY 14653-5722

Description:

Sets up a rectangular grid corresponding to a bitmap of a string
    of (non-touching) characters and solves Poisson's equation on
    the grid after setting each black pixel to a constant charge.
*/ include <stdio.h>
include <math.h> include <X11/Xlib.h>
include <X11/Xutil.h>
include <X11/Xmu/Drawing.h> include "structures.h"

include "graphics.h"

#define PIXEL_VOLTAGE 0.25
#define PIXEL_CHARGE 0.0005
#define ANODE_VOLTAGE 0.004
#define BG_CHARGE 0.0
#define START_BOX 3
#define END_BOX 33
#define DEFAULT_ERROR_FILE "segment.errors"

main(argc, argv)

int   argc;
char  *argv[];

{
    FILE *fopen(), *in_file, *err_file;
    char **forms_array, **get_formnames(), dirname[300],
```

```
    in_file_name[300], out_dir[300], *label, *error_file,*form_file;
int    num_forms, form_index, box_index, start_box, end_box, trials;

char *string_bitmap;
int    get_bitmap(), char_cnt;
double    **eqn_array;
double    *rhs, sqr();
float background_charge, anode_voltage, pixel_charge;
unsigned int    nx, ny, nchar, junk;
int    i, j;
void split_bitmap(), simple_relax(),
    apply_slope(), init_graphic_window(); display_bitmap(),
    handle_user_input(), write_bitmaps();
Bitmap_Struct *bitmap_list;
extern    XImage *image;
extern    Display *dpy;
extern    int    screen;
extern Window window;
extern GC     gc;
extern unsigned long fg, bg;

/* Check number of arguments */
if(argc < 6)
{
    fprintf(stderr, "Usage: %s <NIST directory> <form file> ",
                    argv[0]);
    fprintf(stderr, "<Segmented character output dir> ");
    fprintf(stderr, "<start box #> <end box #> [error file]0)
    exit();
} if(argc >= 7)
    error_file = argv[6];
else
    error_file = DEFAULT_ERROR_FILE;

form_file = argv[2];
anode_voltage = ANODE_VOLTAGE;
pixel_charge = PIXEL_CHARGE;
background_charge = BG_CHARGE;

sscanf(argv[4], "%d", &start_box);
sscanf(argv[5], "%d", &end_box);

num_forms = 1;

init_graphic_window();

/* For all bitmaps */
for(form_index = 0; form_index < num_forms; form_index++)
{ for(box_index = start_box; box_index <= end_box; box_index++)
{
    err_file = fopen(error_file, "a+");
    if(box_index < 10)
    {
```

```c
        sprintf(in_file_name, "%s/%s/box_0%d/box_0%d.pct ",
                argv[1], form_file, box_index,
                box_index);
}
else
{
 sprintf(in_file_name, "%s/%s/box_%2d/box_%2d.pct ",
                argv[1], form_file, box_index,
                box_index);
} puts(in_file_name);
puts(out_dir);

get_bitmap(in_file_name, &nchar, &label);

/* Display bitmap data on screen */
display_bitmap();

nx = image->width;
ny = image->height;

/* Get memory for the coefficient array */
trials = 0;
if(((rhs = (double *)calloc(nx * ny, sizeof(double)))
        == NULL) && (trials < 10))
{
        sleep(15);
        trials++;
}
if(trials >= 10)
{
    fprintf(stderr,
        "Not enough memory .... giving up !0);
    exit();
} eqn_array = (double **)calloc(5, sizeof(double *));
for(i = 0; i < 5; i++)
{
    trials = 0;
    while(((eqn_array[i] =
        (double *)calloc(nx*ny, sizeof(double)))
            == NULL) && (trials < 10))
    {
        sleep(15);
        trials++;
    }
    if(trials >= 10)
    {
        fprintf(stderr,
          "Not enough memory....giving up !0);
        exit();
    }
}

/* Fill coefficient array */
for(i = 0; i < nx*ny ; i++)
{
```

```c
        eqn_array[0][i] = 1.0; /* Top */
        eqn_array[1][i] = 1.0; /* Left */
        eqn_array[2][i] = -4.0; /* Center */
        eqn_array[3][i] = 1.0; /* Right */
        eqn_array[4][i] = 1.0; /* Bottom */
        rhs[i] = background_charge; /* RHS */
}

/* Positive potential on top and zero at the bottom */
    /* Pseudo-node above at constant potential */
for(i = 0; i < nx; i++)
{
    eqn_array[0][i] = 0.0;
    rhs[i] -= 0.0;
    eqn_array[4][nx*ny - i - 1] = 0.0;
    rhs[nx*ny - i] -= 0.0;
}

/* Walls on the sides--Dirichlet boundary conditions */
for(i = 0; i < ny; i++)
{
    eqn_array[2][i*nx]++;
    eqn_array[3][i*nx] = 0.0;
    eqn_array[2][(i + 1)*nx - 1]++;
    eqn_array[1][(i + 1)*nx - 1] = 0.0;
}

/* High negative charges for pixels set to
    foreground color*/
for(i = 0; i < ny; i++)
    for(j = 0; j < nx; j++)
        if(XGetPixel(image, j, i) == bg)
            rhs[i*nx + j] = -pixel_charge;

/* Solve Poisson's equation */
simple_relax(eqn_array, rhs, nx, ny);

/* Free eqn_array */
for(i = 0; i < 5; i++)
    free(eqn_array[i]);
free(eqn_array);

/* Apply a voltage by adding a slope */
            apply_slope(rhs, anode_voltage, nx, ny);

/* Perform segmentation by "binary fission" */
            split_bitmap(rhs, nchar, nx, ny, &bitmap_list,
                            &char_cnt);

/* Free solution vector */
            free(rhs);

/* Event handler */
            handle_user_input(bitmap_list, char_cnt);

/* Write out character bitmaps */
            write_bitmaps(bitmap_list, char_cnt,
                    argv[3], box_index, label, argv[2]);
```

```
                /* If number of detected characters different from
                   expected, write filename in error file */
                if(char_cnt != nchar)
                        fprintf(err_file, "%s0, in_file_name);

/* Free image data */
                free(string_bitmap);

/* Free XImage structure */
                free(image);

/* Free label string */
                free(label);

/* Free bitmap list */
                free(bitmap_list);

/* Close error file */
                fclose(err_file);
            }
        } fclose(err_file);

XCloseDisplay(dpy);
} double sqr(x)

double x;

{
        return(x*x);
}
*/
```

Description:

Takes as input a "potential" array, and separates bitmaps based upon
the path taken by particles through the field.
*/

```
#define    PAD 20
define CHAR_FRACTION 5 void
split_bitmap(rhs, nchar, nx, ny, bitmap_list, char_cnt)

double    *rhs;
int    nchar, nx, ny;
Bitmap_Struct **bitmap_list;
int    *char_cnt;

{
        Point_List *point_list;
        int       j, n, delta_x, x_start, new, old, tmp, i, dummy;
        int       trace_path(), empty_bitmap_section();
        void      copy_bitmap_section();
```

```
char      *string_bitmap;
extern    GC  gc;

point_list = (Point_List *)calloc(2, sizeof(Point_List));
for(i = 0; i < 2; i++)
      point_list[i].coordinates = (int *)calloc(ny, sizeof(int));

/* Get memory for twice the number of characters specified */
(*bitmap_list) = (Bitmap_Struct *) calloc((2*nchar),
                      sizeof(Bitmap_Struct));

/* Fill point-list array for left boundary */
point_list[0].max = 0;
point_list[0].min = 0;
for(n = 0; n < ny; n++)
      (point_list[0].coordinates)[n] = 0;

new = 1;
old = 0;

/* PAD is the total padding on the left and the right */
delta_x = (int)((nx - PAD)/(CHAR_FRACTION*nchar));
if(delta_x < 1)delta_x = 1;
/* *char_cnt = 0;

while(((*char_cnt) < nchar) && (delta_x >= 1))
      {
*/
            *char_cnt = 0;
            for(x_start = PAD; x_start < nx - 1; x_start += delta_x)
            {
                  if(trace_path(x_start, rhs, nx, ny, &(point_list[new])))
                  {
                        if(!empty_bitmap_section(point_list[old],
                              point_list[new], ny))
                        {
                              for(i = 0; i < ny; i++)
                              {
                                XDrawPoint(dpy, display_pixmap, gc,
                                (point_list[old].coordinates)[i],
                                ny - i - 1);
                                XDrawPoint(dpy, display_pixmap, gc,
                                (point_list[new].coordinates)[i],
                                ny - i - 1);
                              }

/* Don't copy bitmaps beyond 2*nchar */
                              if((*char_cnt) < 2*nchar)
                                copy_bitmap_section
                                  (x_start, point_list[old],
                                    point_list[new], bitmap_list,
                                    (*char_cnt));
                              (*char_cnt)++;
                        }
                        tmp = new;
                        new = old;
                        old = tmp;
                  }
            }
      }
```

```
                delta_x = (int)(delta_x/2);
                printf("Delta x:%d0, delta_x);
/*
    }
*/ printf("Number of characters specified: %d0, nchar);
        printf("Number of characters detected : %d0, (*char_cnt));

/* Free point lists */
        for(i = 0; i < 2; i++)
                free(point_list[i].coordinates);
        free(point_list);
} int
trace_path(x_start, rhs, nx, ny, point_list)

int        x_start, nx, ny;

double         *rhs;
Point_List *point_list;

{
        int             x, y, x_move, y_move, x_offset, y_offset, i;
        float           tmp, fmax;
        int             isqr();
        extern   Display        *dpy;
        extern   int            screen;
        extern   Window         window;
        extern   GC             gc;
        extern   Pixmap         display_pixmap;

y = ny - 2;
        x = x_start;
        point_list->max = 0;
        point_list->min = 10000;
        (point_list->coordinates)[0] = x_start;
        i = 1;
        while((y > 0) && (y < ny - 1))
        {

/* Evaluate potential gradient in all directions */
                fmax = -100.0;
                for(x_offset = -1; x_offset <= 1; x_offset++)
                    for(y_offset = -1; y_offset <= 1; y_offset++)
                        if(!((x_offset == 0) && (y_offset == 0)))
                            if((tmp = (rhs[y*nx + x] -
                                    rhs[(y + y_offset)*nx + x + x_offset])/
                                    sqrt(isqr(x_offset)+isqr(y_offset)))
                                    >= fmax)
                            {
                                    fmax = tmp;
                                    x_move = x_offset;
                                    y_move = y_offset;
                            }
```

```
if(fmax > 0.0)
{
    /* Move in direction of highest gradient */
    x += x_move;
    y += y_move;
    if(y_move == 0)i--;
    if(x > point_list->max)
        point_list->max = x;
    if(x < point_list->min)
        point_list->min = x;
    (point_list->coordinates)[i] = x;
    i++;
}
else
{ return(0);

}
    }
    if(y < ny - 1)
        /* Particle managed to get across */
        return(1);
    else
        /* Particle went backwards ! */
        return(0);
} int
isqr(x)

int  x;

{
    return(x*x);
} int
empty_bitmap_section(point_list_left, point_list_right, ny)

Point_List point_list_left, point_list_right;
int       ny;

{
    int  i,j;
    extern int screen;
    extern XImage *image;
    extern Display *dpy;
    int  cnt;
    extern unsigned long fg, bg;

/* Check for width -- very narrow bitmaps are probably empty */
    if((point_list_right.max - point_list_left.min) <= 10)
        return(1);

cnt = 0;
    for(i = ny - 1; i >= 0; i--)
        for(j = (point_list_left.coordinates)[ny - i - 1];
            j < (point_list_right.coordinates)[ny - i - 1]; j++)
```

```
            if(XGetPixel(image, j, i) == bg)
                if(cnt++ >= 20)
                    return(0);

return(1);
} void
copy_bitmap_section(x_start, point_list_left, point_list_right, bitmap_list, char_cnt)

int         x_start, char_cnt;
Point_List  point_list_left, point_list_right;
Bitmap_Struct **bitmap_list;

{
    unsigned char  *data;
    unsigned int   x, y, width, height, width_of_strip;
    XImage         *char_image;
    extern   XImage    *image;
    extern   Display   *dpy;
    extern   Window    window;
    extern   Pixmap    string_pixmap;
    extern   intscreen;
    extern   GC        gc, gc_red;
    extern   unsigned long   fg, bg;

/* Compute width and height of character */
    width = point_list_right.max - point_list_left.min + 1;
    height = image->height;

/* Create a pixmap to hold the segmented character */
    (*bitmap_list)[char_cnt].pixmap = XCreatePixmap(dpy, window,
                        width, height, 8, 0);

XSetForeground(dpy, gc, bg);
    XFillRectangle(dpy, (*bitmap_list)[char_cnt].pixmap,
            gc, 0, 0, width, height);

XDrawRectangle(dpy, (*bitmap_list)[char_cnt].pixmap,
            gc, 0, 0, width, height);
    XSetForeground(dpy, gc, fg);

(*bitmap_list)[char_cnt].nx = width;
    (*bitmap_list)[char_cnt].ny = height;
    (*bitmap_list)[char_cnt].x_position = point_list_left.min;

/* Copy section from original bitmap by stripwise XCopyArea */
    for(y = 0; y < height; y++)
    {
        width_of_strip = (point_list_right.coordinates)[height - y - 1]
                -(point_list_left.coordinates)[height - y - 1];
        XCopyArea(dpy, string_pixmap, (*bitmap_list)[char_cnt].pixmap,
            gc_red,
            (point_list_left.coordinates)[height - y - 1],
```

```
                    y, width_of_strip, 1,
                    (point_list_left.coordinates)[height - y - 1]
                        - point_list_left.min, y);
        }
    }
```

Description:
    A simple relaxation scheme to solve Poisson's equation approximately.

```
*/
#define TOLERANCE 5.0e-3
define ACCELERATION_FACTOR 1.4 void
simple_relax(eqn_array, rhs, nx, ny)

double   **eqn_array, *rhs;
int   nx, ny;

{
    int   i, j, it, cnt;
    double   *u, residual, residual1, residual2, error, temp, temp1, temp2;

cnt = 0;
    /* Get memory for u array */
    while(((u = (double *)calloc(nx*ny, sizeof(double))) == NULL)
          && (cnt < 10))
    {
        sleep(15);
        cnt++;
    }

/* Repeat until maximum error is less than TOLERANCE */
    error = 1.0;
    it = 0;
    while(error > TOLERANCE)
    {
        /* For all equations */
        error = 0.0;
        /* Do all the non-border points */
        for(i = 1; i < ny - 1; i++)
            for(j = 1; j < nx - 1; j++)
            {
            /* Compute residual */
            residual =
              eqn_array[0][i*nx + j]*u[i*nx + j - nx] +
              eqn_array[1][i*nx + j]*u[i*nx + j - 1] +
              eqn_array[3][i*nx + j]*u[i*nx + j + 1] +
              eqn_array[4][i*nx + j]*u[i*nx + j + nx] +
              eqn_array[2][i*nx + j]*
                  u[i*nx + j] - rhs[i*nx + j];

/* Update error */ if((temp = fabs(residual)) > error)
                error = temp;

/* Update element */
            u[i*nx + j] -=
```

```
                    ACCELERATION_FACTOR *
                    residual/eqn_array[2][i*nx + j];
    }

/* Do all the border points */
/* First the top and bottom rows ... */
for(j = 1; j < nx-1; j++)
{
    residual1 = eqn_array[1][j]*u[j - 1] +
        eqn_array[3][j]*u[j + 1] +
        eqn_array[4][j]*u[j + nx] +
        eqn_array[2][j]* u[j] - rhs[j];

residual2 =
        eqn_array[0][(ny-1)*nx + j]*u[(ny-1)*nx + j - nx] +
        eqn_array[1][(ny-1)*nx + j]*u[(ny-1)*nx + j - 1] +
        eqn_array[3][(ny-1)*nx + j]*u[(ny-1)*nx + j + 1] +
        eqn_array[2][(ny-1)*nx + j]*
            u[(ny-1)*nx + j] - rhs[(ny-1)*nx + j];

/* Update error */
    if((temp1 = fabs(residual1)) > error)
        error = temp1;

/* Update error */
    if((temp2 = fabs(residual2)) > error)
        error = temp2;

/* Update element */
    u[j] -=
        ACCELERATION_FACTOR *
        residual1/eqn_array[2][j];

/* Update element */
    u[(ny-1)*nx + j] -=
        ACCELERATION_FACTOR *
        residual2/eqn_array[2][(ny - 1)*nx + j];
}

/* ... then the left and right rows */
for(i = 1; i < ny-1; i++)
{
    /* Compute residual */
    residual1 =
        eqn_array[0][i*nx]*u[i*nx - nx] +
        eqn_array[3][i*nx]*u[i*nx + 1] +
        eqn_array[4][i*nx]*u[i*nx + nx] +
        eqn_array[2][i*nx]*
            u[i*nx] - rhs[i*nx];

residual2 =
        eqn_array[0][i*nx + (nx-1)]*u[i*nx + (nx-1) - nx] +
        eqn_array[1][i*nx + (nx-1)]*u[i*nx + (nx-1) - 1] +
        eqn_array[4][i*nx + (nx-1)]*u[i*nx + (nx-1) + nx] +
        eqn_array[2][i*nx + (nx-1)]*
            u[i*nx + (nx-1)] - rhs[i*nx + (nx-1)];

/* Update error */
    if((temp1 = fabs(residual1)) > error)
        error = temp1;
```

```
/* Update error */
if((temp2 = fabs(residual2)) > error)
    error = temp2;

/* Update element */
u[i*nx] -=
    ACCELERATION_FACTOR *
    residual1/eqn_array[2][i*nx];

/* Update element */
u[i*nx + nx - 1] -=
    ACCELERATION_FACTOR *
    residual2/eqn_array[2][i*nx + nx - 1];
}

/* Finally the four corners */
/* Top left ... */
residual =
    eqn_array[3][0]*u[1] +
    eqn_array[4][0]*u[nx] +
    eqn_array[2][0]*
        u[0] - rhs[0];
if((temp = fabs(residual)) > error)
    error = temp;
u[0] -=
    ACCELERATION_FACTOR *
    residual/eqn_array[2][0];

/* ... top right ... */
    residual =
        eqn_array[1][nx-1]*u[nx - 2] +
        eqn_array[4][(nx - 1)]*u[(nx - 1) + nx] +
        eqn_array[2][(nx - 1)]*
            u[(nx - 1)] - rhs[(nx - 1)];

if((temp = fabs(residual)) > error)
    error = temp;

u[nx-1] -=
    ACCELERATION_FACTOR *
    residual/eqn_array[2][nx-1];

/* ... bottom left ...*/
    residual =
        eqn_array[0][(ny - 1)*nx]*u[(ny - 1)*nx - nx] +
        eqn_array[3][(ny - 1)*nx]*u[(ny - 1)*nx + 1] +
        eqn_array[2][(ny - 1)*nx]*
            u[(ny - 1)*nx] - rhs[(ny - 1)*nx];

if((temp = fabs(residual)) > error)
    error = temp;

u[(ny-1)*nx] -=
    ACCELERATION_FACTOR *
    residual/eqn_array[2][(ny-1)*nx];

/* ... and bottom right */
    residual =
        eqn_array[0][(ny-1)*nx + (nx-1)]*
            u[(ny-1)*nx + (nx-1) - nx] +
```

```
                eqn_array[1][(ny-1)*nx + (nx-1)]
                        *u[(ny-1)*nx + (nx-1) - 1] +
                eqn_array[2][(ny-1)*nx + (nx-1)]*
                        u[(ny-1)*nx + (nx-1)] - rhs[(ny-1)*nx + (nx-1)];

if((temp = fabs(residual)) > error)
                error = temp;

u[(ny-1)*nx + (nx-1)] -=
                ACCELERATION_FACTOR *
                residual/eqn_array[2][(ny-1)*nx + (nx - 1)];

it++;
        }

/* Copy solution to rhs array */
        for(i = 0; i < nx*ny; i++)
                rhs[i] = u[i];

/* Free temporary array */
        free(u);

}
/*
```

Description:

Takes the zero-applied-field solution to Poisson's equation and
applies a "field" by adding a constant proportional to the distance
from the cathode to each point.
*/ define SLOPE

```
void
apply_slope(u, anode_voltage, nx, ny)

double   *u, anode_voltage;
int   nx, ny;

{
    int   i, j;

for(i = 0; i < ny; i++)
        for(j = 0; j < nx; j++)
            u[i*nx + j] += (double)(i*anode_voltage/ny);
}
/*
```

History:
    Started ..... January 2, 1990

Description:

*/

```
#define DISPLAY "degas:0.0"

void
init_graphic_window()

{

XEvent      event;
    KeySym      key;
    XSizeHints  hint;
    extern unsigned long fg, bg;
    char        *argv[1];
    int         argc;
    extern Display *dpy;
    extern int  screen;
    extern Window window;
    extern GC gc, gc_red;
    XColor      rgb_color, hardware_color;
    Font        font;
    extern XFontStruct *font_struct;

/* Open display connection */
    dpy = XOpenDisplay(DISPLAY);
    screen = DefaultScreen(dpy);

XAllocNamedColor(dpy, DefaultColormap(dpy, screen), "red", &rgb_color,
            &hardware_color);

font_struct = XLoadQueryFont(dpy, "-adobe-new century schoolbook-bold-r-normal--12-120-75-75-p font = font_struct->fid;

argc = 0;
    argv[0] = NULL;
    fg = WhitePixel(dpy, screen);
    bg = BlackPixel(dpy, screen);

hint.x = 100;
    hint.y = 100;
    hint.width = 100;
    hint.height = 100;

window = XCreateSimpleWindow(dpy, DefaultRootWindow(dpy), 100, 100,
            100, 100, 5, fg, bg);

XSetStandardProperties(dpy, window, "Poisson Segmenter",
            "Poisson Segmenter",
            None, argv, argc, &hint);

gc = XCreateGC(dpy, RootWindow(dpy, screen), 0, NULL);
    XSetBackground(dpy, gc, bg);
    XSetForeground(dpy, gc, fg);
    XSetFont(dpy, gc, font);
```

```
    gc_red = XCreateGC(dpy, RootWindow(dpy, screen), 0, NULL);
    XSetBackground(dpy, gc_red, bg);
    XSetForeground(dpy, gc_red, rgb_color.pixel);

XSelectInput(dpy, window, KeyPressMask | ExposureMask
                    | ButtonPressMask);

}
/*
```

Description:
    Creates pixmaps for segmentation using external XImage structure.

```
*/ void
display_bitmap()

{
    extern unsigned long fg, bg;
    static Bool is_first_time = 1;
    extern Display *dpy;
    extern int     screen;
    extern Window  window;
    extern GC      gc;
    extern XImage  *image;
    extern Pixmap  display_pixmap, string_pixmap;
    XImage         *bounding_box();

/* Resize window to the actual size of the bitmap */
    XResizeWindow(dpy, window, image->width, image->height);

/* If not first time, then free the pixmap ID already created */
    if(!is_first_time)
        XFreePixmap(dpy, display_pixmap);

/* Create Pixmap for display */
    display_pixmap = XCreatePixmapFromBitmapData(dpy, window,
                image->data, image->width, image->height,
                fg, bg, 8);

/* Create (identical) Pixmap to save the original bitmap */
    string_pixmap = XCreatePixmapFromBitmapData(dpy, window,
                image->data, image->width, image->height,
                fg, bg, 8);

is_first_time = 0;

/* Copy pixmap to window and flush output buffer */
    XCopyArea(dpy, display_pixmap, window, gc, 0, 0, image->width,
            image->height, 0, 0);
    XMapRaised(dpy, window);

XFlush(dpy);
}
/*
```

Description:

Event handler for the Poisson segmenter.

*/

```
void
handle_user_input(bitmap_list, char_cnt)

Bitmap_Struct  *bitmap_list;
int        char_cnt;

{
    int    done, i;
    XEvent    event;
    extern Display  *dpy;
    extern int     screen;
    extern Window   window;
    extern GC       gc, gc_red;
    extern XImage  *image;
    extern Pixmap   display_pixmap;
    int        x_bit, y_bit, x_char, y_char, pitch, ascent, descent,
               string_xextent, string_yextent, direction;
    char       string[20];
    XCharStruct    overall;
    extern   XFontStruct   *font_struct;
    extern unsigned long fg, bg;

done = 0;
    while (done == 0)
    {
        XNextEvent(dpy, &event);
        switch(event.type)
        {
            case Expose:
                if(event.xexpose.count == 0)
                {
                    XCopyArea(dpy, display_pixmap,
                    window, gc, 0, 0, image->width,
                    image->height, 0, 0);

XDrawLine(dpy, window, gc, 0,
                        image->height, image->width,
                        image->height);

x_bit = 5;
                    y_bit = image->height + 5;
                    for(i = 0; i < char_cnt; i++)
                    {
                        sprintf(string, "%d ", i);

XCopyArea(dpy, bitmap_list[i].pixmap,
                        window, gc_red,
                        0, 0, bitmap_list[i].nx,
                        bitmap_list[i].ny,
                        x_bit, y_bit);

XDrawRectangle(dpy, window, gc,
                        x_bit, y_bit, bitmap_list[i].nx,
                        bitmap_list[i].ny);
```

```
                    XDrawString(dpy, window, gc_red,
                    x_bit + 3, y_bit+10,
                    string, strlen(string));

x_bit += bitmap_list[i].nx + 5;
                }
                if(x_bit > image->width)
                    XResizeWindow(dpy, window,
                    x_bit, 2 * image->height + 10);
                else
                    XResizeWindow(dpy, window,
                    image->width, 2 * image->height
                    + 10);

}
                break;

case MappingNotify:
            XRefreshKeyboardMapping(&event);
            break;

case ButtonPress:
            done = 1;
            break;

case KeyPress:
            done = 1;
            break;
        }
    }
}

/*
```

Description:

Writes character bitmaps out to file.
*/

```
void
write_bitmaps(bitmap_list, char_cnt, out_dir, box_num, label, form_file)

Bitmap_Struct  *bitmap_list;
int            char_cnt, box_num;
char           *out_dir, *label;
char           *form_file;

{
    int  i;
    char filename[100];

for(i = 0; i < char_cnt; i++)
    {
        if(box_num < 10)
            sprintf(filename, "%s/%c/%s_box_0%d.%d.%c.bm",
            out_dir, label[i], form_file, box_num, i, label[i]);
        else
```

```
sprintf(filename, "%s/%c/%s_box_%2d.%d.%c.bm ",
    out_dir, label[i], form_file, box_num, i, label[i]);

XWriteBitmapFile(dpy, filename, bitmap_list[i].pixmap,
    bitmap_list[i].nx, bitmap_list[i].ny, -1, -1);
   }
}
```

I claim:

1. A method for performing segmentation of a bitmap image, said method comprising the steps of:

producing a bitmap image from an original image, wherein said bitmap image contains a matrix of pixels arranged between boundaries and a plurality of said pixels form a pattern;

assigning a charge value to each pixel in said bitmap image where said pattern is present and assigning a different charge value at each pixel in said bitmap where said pattern is not present;

applying a first potential to a plurality of pixels defining a first boundary of said bitmap image and applying a second potential greater than said first potential to a plurality of pixels defining a second boundary opposite said first boundary;

calculating a potential distribution throughout said bitmap image, said potential distribution being responsive to said applied first and second potentials and said charges assigned to each pixel;

determining a path of steepest potential gradient between said first and second boundaries; and segmenting said bitmap into individual bitmaps along said path.

2. The method of claim 1 wherein said calculating step further includes the steps of:

calculating a potential value at each pixel in said bitmap image using a two-dimensional Poisson's equation hving the following form:

$$\frac{\partial^2 V}{\partial x^2} + \frac{\partial^2 V}{\partial y^2} = -\frac{\rho}{\epsilon}$$

where V is a potential at any location (x,y) within said bitmap image; $\epsilon$ is a dielectric constant assigned to said bitmap image; and $\rho$ is said charge value assigned to each pixel in said pattern.

3. The method of claim 2 wherein said segmenting step further includes the steps of:

starting at a pixel in said first boundary;

determining a location of a neighboring pixel having at least potential of all neighboring pixels;

moving to said pixel location having said higher potential;

repeating said determining and moving steps until said neighboring pixel having a lesser potential does not exist;

repeating said starting, determining, moving and repeating steps until all of said pixels in said first boundary are used as starting pixels; and determining said path of at least potential as a path using a least number of pixels to move from said first boundary to said second boundary;; and segmenting said bitmap image along said path.

4. The method of claim 3 wherein said step of applying a potential includes the steps of:

applying a third potential to a plurality of pixels defining a third boundary of said image and applying a fourth potential greater than said third potential to a plurality of pixels defining a fourth boundary opposite said third boundary.

5. The method of claim 4 wherein said segmenting step further includes the steps of:

starting at a pixel adjacent said third boundary;

determining a location of a neighboring pixel having at least potential of all neighboring pixels;

moving to said pixel location having said lesser potential;

repeating said determining and moving steps until said neighboring pixel having a lesser potential does not exist;

repeating said starting, determining, moving, and repeating steps until all of said pixels in said third boundary are used as starting pixels; and determining said path of least potential as a path using a least number of pixels to move from said third boundary to said fourth boundary; and segmenting said bitmap image along said path.

6. The method of claim 1 wherein said segmenting step further includes the steps of:

starting at a pixel adjacent said first boundary;

determining a location of a neighboring pixel having a least potential of all neighboring pixels;

moving to said pixel location having said least potential;

repeating said determining and moving steps until said neighboring pixel having a lesser potential does not exist;

repeating said starting, determining, moving and repeating steps until all of said pixels in said first boundary are used as starting pixels;

determining said path of least potential as a path using a least number of pixels to move from said boundary to said second boundary; and segmenting said bitmap image along said path.

7. The method of claim 6 wherein said step of applying a potential includes the steps of:

applying a third potential to a plurality of pixels defining a third boundary of said image and applying a fourth potential greater than said third potential to a plurality of pixels defining a fourth boundary opposite said third boundary.

8. The method of claim 7 wherein said segmenting step further includes the steps of:

starting at a pixel adjacent said third boundary;

determining a location of a neighboring pixel having a least potential of all neighboring pixels;

moving to said pixel location having said lesser potential;

repeating said determining and moving steps until said neighboring pixel having a lesser potential does not exist;

repeating said starting, determining, moving and repeating steps until all of said pixels in said third boundary are used as starting pixels; and determining said path of least potential as a path using a least number of pixels to move from said third boundary to said fourth boundary; and segmenting said bitmap image along said path.

9. Apparatus for performing segmentation of a bitmap image, said apparatus comprising:

means for producing said bitmap image from an original image, wherein said bitmap image contains a matrix of pixels arranged between boundaries and a plurality of said pixels form a pattern;

means, connected to said producing means, for assigning a charge value to each pixel in said bitmap image where said pattern is present and for assigning a different charge value at each pixel in said bitmap where said pattern is not present;

means for applying a first potential to a plurality of pixels defining a first boundary to said image and for applying a second potential greater than said first potential to a plurality of pixels defining a second boundary opposite said first boundary;

means for calculating a potential distribution throughout said bitmap image, said potential distribution being responsive to said applied first and second potentials and said charges assigned to each pixel;

means for determining a path of steepest potential gradient between said boundaries; and means for segmenting said bitmap into individual bitmaps along said path.

10. The apparatus of claim 9 wherein said calculating means further comprises:

means for determining a potential value at each pixel in said bitmap image using a two-dimensional Poisson's equation having the following form:

$$\frac{\partial^2 V}{\partial x^2} + \frac{\partial^2 V}{\partial y^2} = -\frac{\rho}{\epsilon}$$

where V is a potential at any location (x,y) within said bitmap image; $\epsilon$ is a dielectric constant assigned to said bitmap image; and $\rho$ is said charge value assigned to each pixel in said pattern.

11. The apparatus of claim 10 wherein said segmenting means further comprises:

means for starting at a pixel adjacent said first boundary;

means for determining a location of a neighboring pixel having a least potential of all neighboring pixels;

means for moving to said pixel location having said lesser potential;

means for repeating engagement of said determining means and moving means until said neighboring pixel having a lesser potential does not exist;

means for repeating engagement of said starting means, determining means, moving means and repeating means until all of said pixels in said first boundary are used as starting pixels;

means for determining said path of lest potential as a path using a least number of pixels to move from said first boundary to said second boundary; and means for segmenting said bitmap image along said path.

12. The apparatus of claim 11 wherein said applying means further comprises:

means applying a third potential to a plurality of pixels defining a third boundary of said image and for applying a fourth potential greater than said third potential to a plurality of pixels defining a fourth boundary opposite said third boundary.

13. The apparatus of claim 12 wherein said segmenting means further comprises:

means for starting at a pixel adjacent said third boundary;

means for determining a location of a neighboring pixel having a least potential of all neighboring pixels;

means for moving to said pixel location having said lesser potential;

means for repeating engagement of said determining means and moving means until said neighboring pixel having a lesser potential does not exist;

means for repeating engagement of said starting means, determining means, moving means and repeating means until all of said pixels in said third boundary are used as starting pixels;

means for determining said path of least potential as a path using a least number of pixels to move from said third boundary to said fourth boundary; and means for segmenting said bitmap image along said path.

14. The apparatus of claim 9 wherein said segmenting means further comprises:

means for starting at a pixel adjacent said first boundary;

means for determining a location of a neighboring pixel having a least potential of all neighboring pixels;

means for moving to said pixel location having said lesser potential;

means for repeating engagement of said determining means and moving means until said neighboring pixel having a lesser potential does not exist;

means for repeating engagement of said starting means, determining means, moving means and repeating means until all of said pixels in said first boundary are used as starting pixels;

means for determining said path of least potential as a path using a least number of pixels to move from said first boundary to said second boundary; and means for segmenting said bitmap image along said path.

15. The apparatus of claim 14 wherein said applying means further comprises:

means applying a third potential to a plurality of pixels defining a third boundary of said image and for applying a fourth potential greater than said third potential to a plurality of pixels defining a fourth boundary opposite said third boundary.

16. The apparatus of claim 15 wherein said segmenting means further comprises:

means for starting at a pixel adjacent said third boundary;

means for determining a location of a neighboring pixel having a least potential of all neighboring pixels;

means for moving to said pixel location having said lesser potential;

means for repeating engagement of said determining means and moving means until said neighboring pixel having a lesser potential does not exist;

means for repeating engagement of said starting means, determining means, moving means and repeating means until all of said pixels in said third boundary are used as starting pixels;

means for determining said path of least potential as a path using a least number of pixels to move from said third boundary to said fourth boundary; and means for segmenting said bitmap image along said path.

* * * * *